United States Patent [19]

Pope

[11] Patent Number: 5,500,875
[45] Date of Patent: Mar. 19, 1996

[54] QAM ENCODING

[75] Inventor: David J. Pope, Blackburn, Australia

[73] Assignee: Signal Processing Associates Pty Limited, Wantirna, Australia

[21] Appl. No.: 74,853

[22] PCT Filed: Dec. 11, 1991

[86] PCT No.: PCT/AU91/00573

§ 371 Date: Jun. 25, 1993

§ 102(e) Date: Jun. 25, 1993

[87] PCT Pub. No.: WO92/10899

PCT Pub. Date: Jun. 25, 1992

[30] Foreign Application Priority Data

Dec. 12, 1990 [AU] Australia ................. PK 3902

[51] Int. Cl.$^6$ .................. H03D 1/00; H04L 5/12
[52] U.S. Cl. ........................... 375/261; 375/341
[58] Field of Search ............ 375/94, 39; 371/43

[56] References Cited

U.S. PATENT DOCUMENTS 3,925,611  12/1975  Dennis ................ 178/22
4,271,527  1/1981   Armstrong ........... 375/39
4,483,012  11/1984  Wei .................. 375/27
4,873,701  10/1989  Tretter ............... 375/27
4,941,154  7/1990   Wei .................. 375/39
4,987,569  1/1991   Ling ................. 370/32.1
5,195,107  3/1993   Wei .................. 375/18

FOREIGN PATENT DOCUMENTS 0122805    10/1984  European Pat. Off. .
0134101    3/1985   European Pat. Off. .
04076763A1 1/1991   European Pat. Off. .

Primary Examiner—Sandra L. O'Shea
Assistant Examiner—John Ning
Attorney, Agent, or Firm—Baker & Daniels

[57] ABSTRACT

The present invention provides a coding technique for QAM systems which does not require differential encoding. Constellation points are chosen such that the set is not symmetrical. No coding for quadrants takes place. During synchronization of the receiver, the received constellation is rotated until the defected signal matches a known output, whereupon the rotation of the constellation is determined.

3 Claims, 5 Drawing Sheets

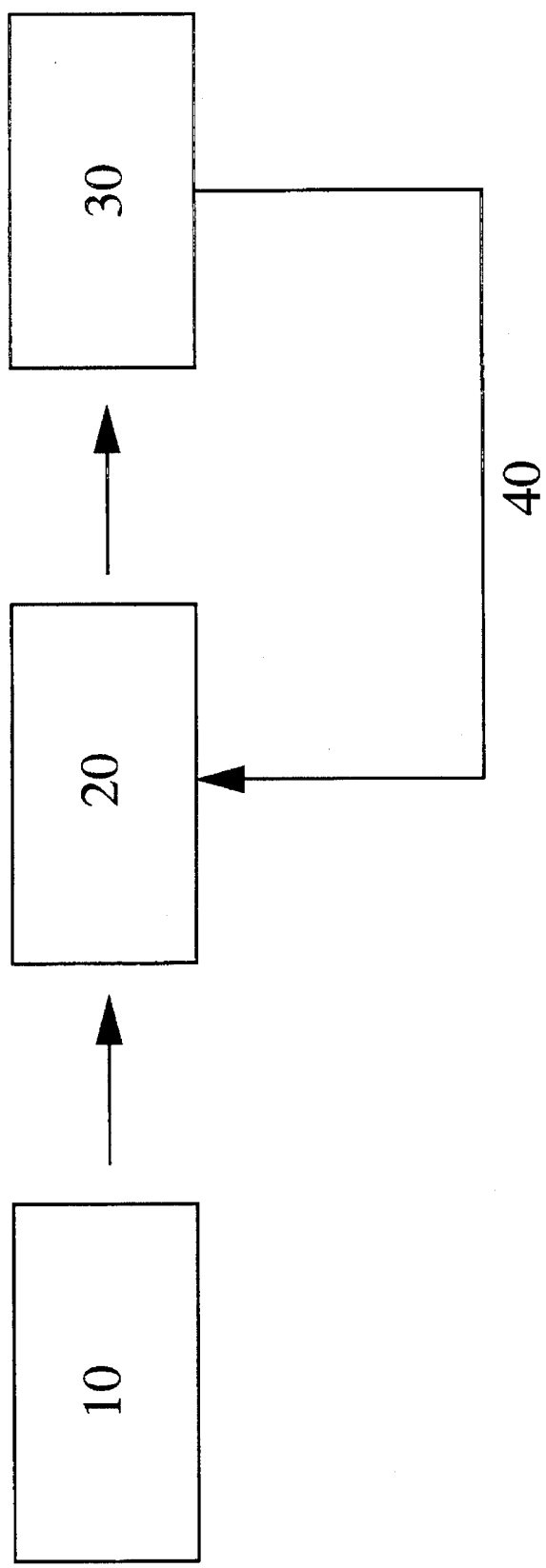

QAM ENCODING

FIELD OF THE INVENTION

This invention relates to the coding of constellation points in a QAM (Quadrature Amplitude Modulation) communications system.

BACKGROUND

QAM modulation techniques are increasingly used to obtain maximum bandwidth efficiency in many communications systems. Such systems encode data by assigning data strings to one of a plurality of points in a signal constellation map in the complex plane.

A problem encountered in all such systems relates to the resolution of quadrant ambiguity resulting from carrier recovery. The receiver has no way of determining which quadrant of the signal constellation the transmitter has used to send a received point. Traditional modem techniques employ differential encoding, by assigning two bits of each data string to define the absolute quadrant. The remaining bits, for example 8 in a 1024 QAM system, are used to define the point within the quadrant. This is illustrated in FIG. 1.

However, there are still difficulties in determining the absolute bit pattern for the received quadrant. In order to overcome ambiguity due to rotation, the points are generally coded such that they incorporate rotational symmetry.

U.S. Pat. Nos. 4,601,044 to Kromer etal, and 4,416,016 to Iapicco disclose techniques for extracting phase information from trellis or convolutional encoded modulations. U.S. Pat. No. 4,866,395 to Hostetter discloses a system for carrier recovery. None of these disclosures addresses the issue of avoiding the requirement for differential encoding.

Conventional design methodologies dictate that differential encoding is essential to solve the phase ambiguity problem.

However, differential encoding in turn creates problems which become particularly evident in a large, for example 1024 point, QAM system. Gray coding on quadrant boundaries is very poor, and can lead to unacceptable error bursts when coupled with differential decoding errors.

It is an object of the present invention to provide a modem design and encoding system which ameliorates the deficiencies of the prior art.

SUMMARY OF INVENTION

According to one aspect, the present invention comprises an improved system for encoding and decoding QAM signals, wherein prior to transmission the signal constellation is directly encoded such that successive rotations about the axes of symmetry of the constellation do not create identical signals, and during reception said signal is decoded by a method comprising successively comparing a received signal with a set of stored signals corresponding to the possible received rotations of a known signal, until a match is found, and thereby resolving the rotational orientation of the received signal.

According to a further aspect, the present invention comprises a method for encoding digital signals for transmission on analog media, comprising the steps of:

converting a digital signal into a set of digital words, each having a predefined length;

encoding each of said words as a point in a signal constellation, each point being defined by a quadrature component and an in-phase component;

wherein said constellation is chosen such that successive rotations with respect to the axes of symmetry will not map the constellation onto itself.

Contrary to prior art modem design, the present invention entirely discards differential encoding, and as a result rotational symmetry is unnecessary. The full QAM constellation may be completely, for example, gray coded.

This creates a difficulty at the receiver, as there is now no explicit specification of the rotational orientation of the constellation. This is overcome by rotating the constellation by predetermined steps, illustratively 90°, until the decoded information matches a known transmitted signal. This is preferably performed as part of the normal synchronisation procedure.

BRIEF DESCRIPTION OF THE DRAWINGS

An embodiment of the present invention will now be described with reference to the accompanying figures, in which:

FIG. 4 is a schematic diagram of the system according to an embodiment of the present invention;

DETAILED DESCRIPTION

Figure 1:
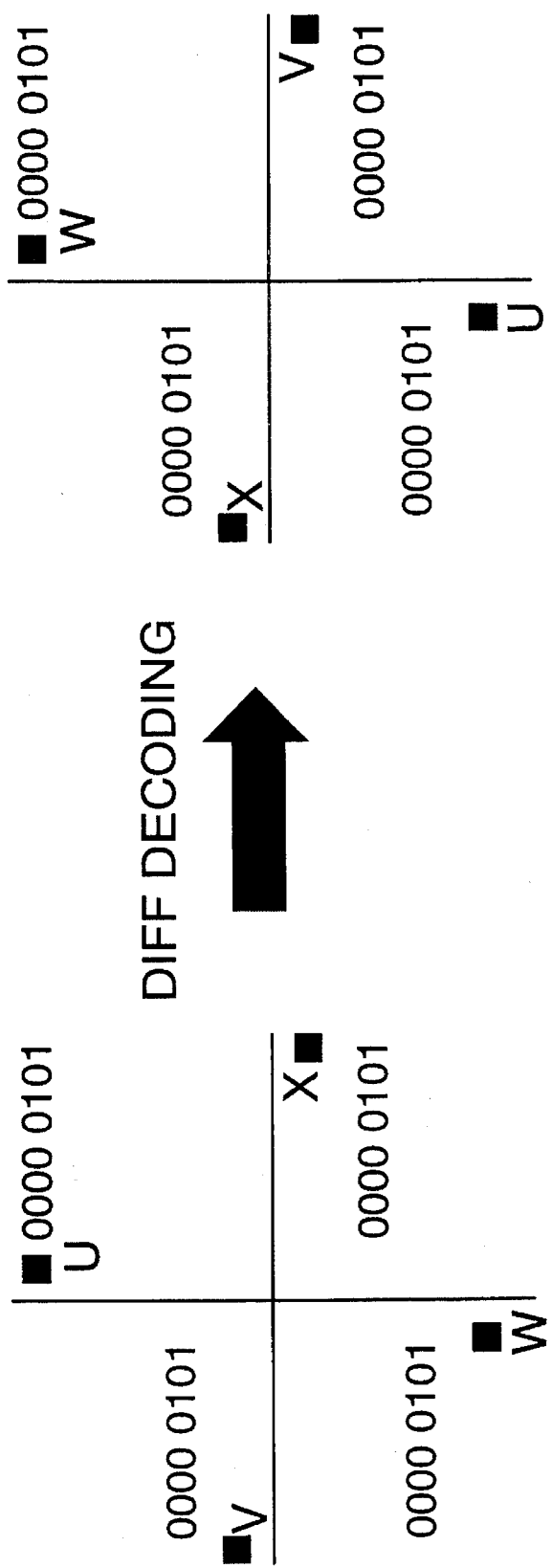
FIG. 1 illustrates prior art differential encoding.
Figure 3:
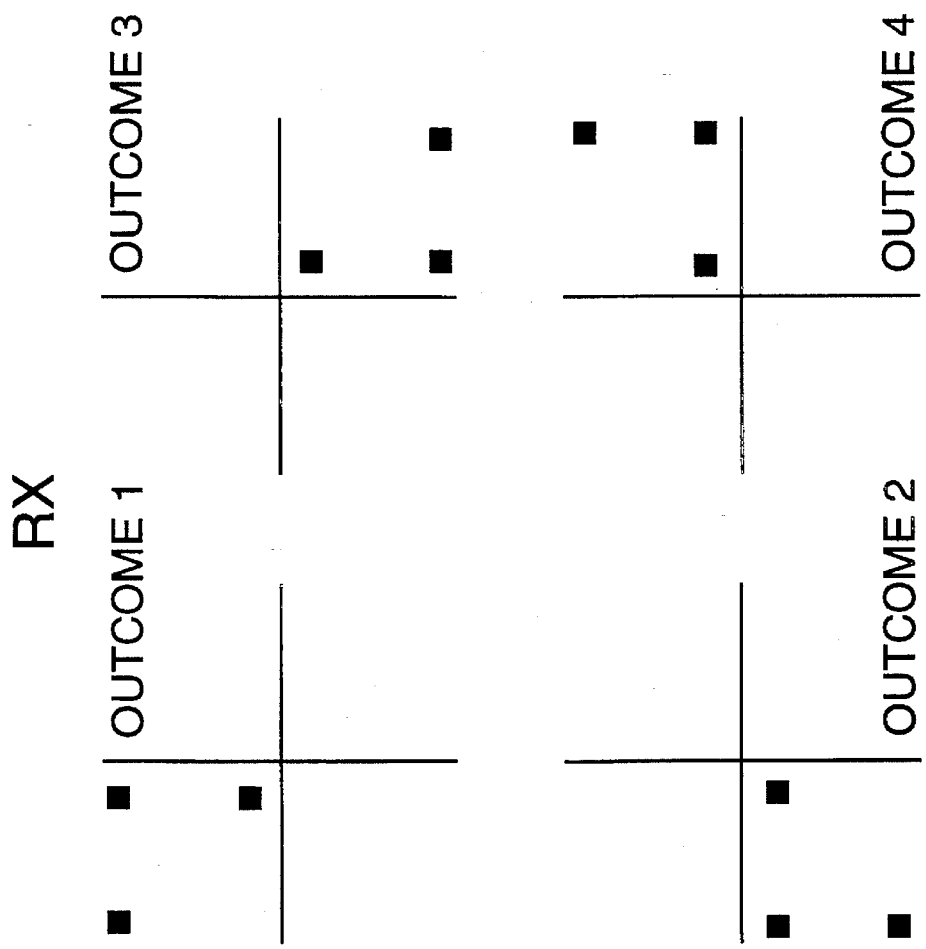
FIG. 3 illustrates a set of possible received signals.
Figure 2:
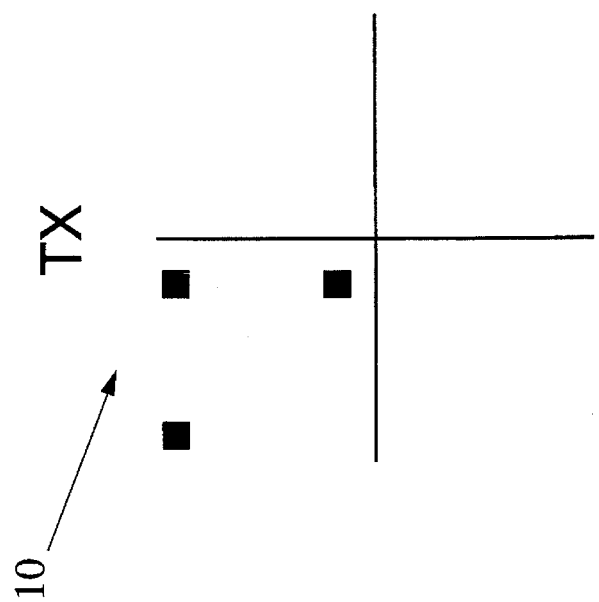
FIG. 2 illustrates a transmitted constellation.

The essential inventive concept is best understood by reference to FIGS. 2, 3 and 4. FIG. 2 shows a sample transmitted constellation, each symbol of which corresponds to a 10-bit data message defined by its in-phase and quadrature components. At the receiver, the transmitted constellation may be received in any one of 4 forms, due to carrier ambiguity. This is shown in FIG. 3. Only outcome 1 is correct. Referring to FIG. 4, the received constellation 10 is compared with each of 4 sections of the Gray Decode EPROM 20 to determine the correct received signal. This EPROM 20 stores each possible received form of the known transmitted constellation shown in FIG. 2. All incorrect versions cause decoding errors. Upon a correct match being made, gate 30 receives an output from EPROM 20 indicating that rotation has been resolved, the received signal is known to be synchronised and normal reception can occur. The comparison stops when the correction section of the EPROM is selected—this may be thought of as rotating the constellation until a match occurs.

Of course, similar systems may be implemented corresponding to other rotations, for instance in systems having more or different axes of symmetry in the signal constellation, where such rotations are meaningful.

If synchronisation is lost during reception, this "constellation rotate" function described above is repeated until a match is detected.

It will be appreciated that "constellation rotate" could equally be implemented using a single stored EPROM signal with the constellation being physically rotated by signal multiplication as is well known. The inventive method encompasses any rotational technique, and may be implemented in association with block, convolutional, trellis or other codings as required in particular applications.

Figure 5:
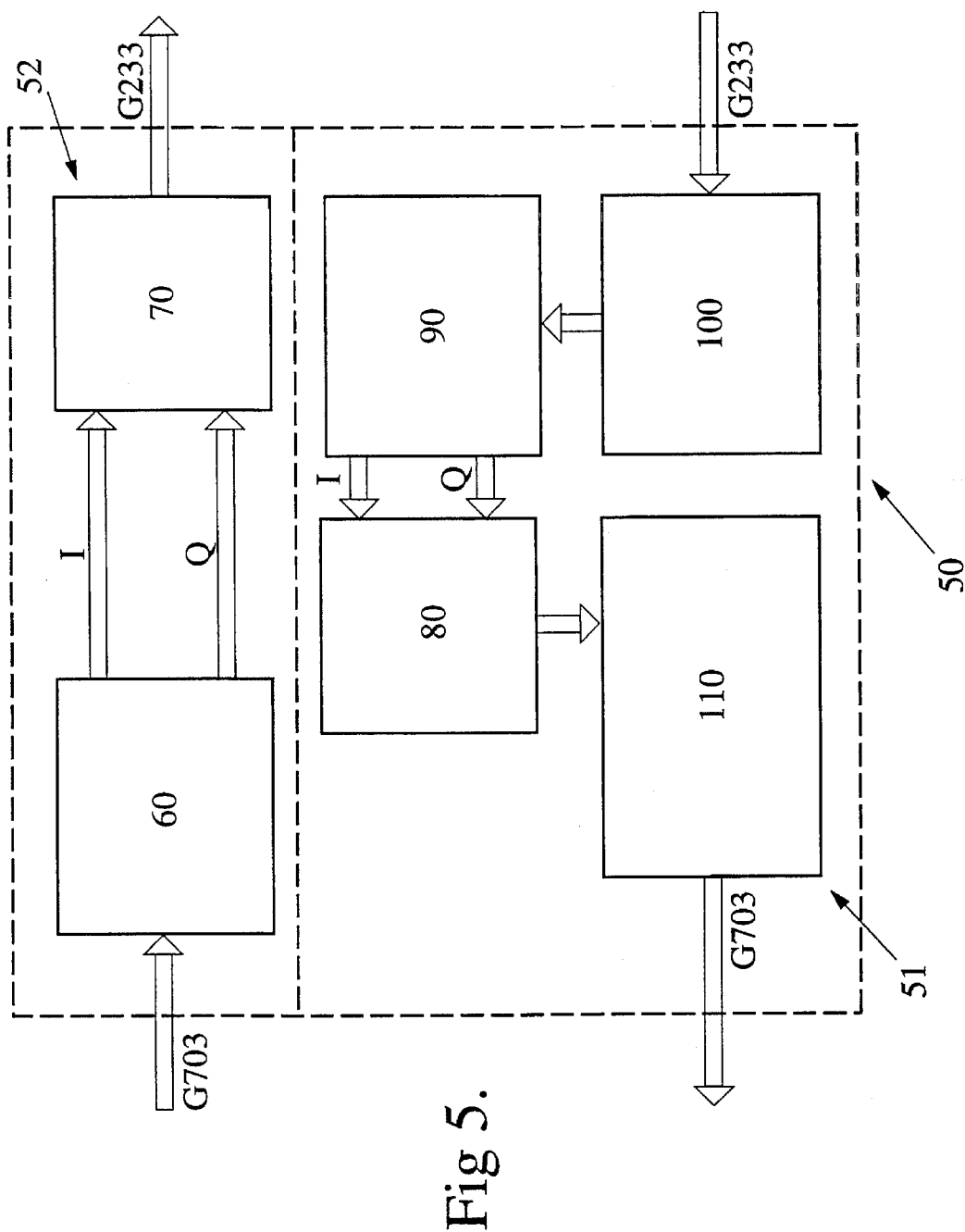
FIG. 5 is a block diagram of one implementation of a modem according to the present invention.
Figure 6:
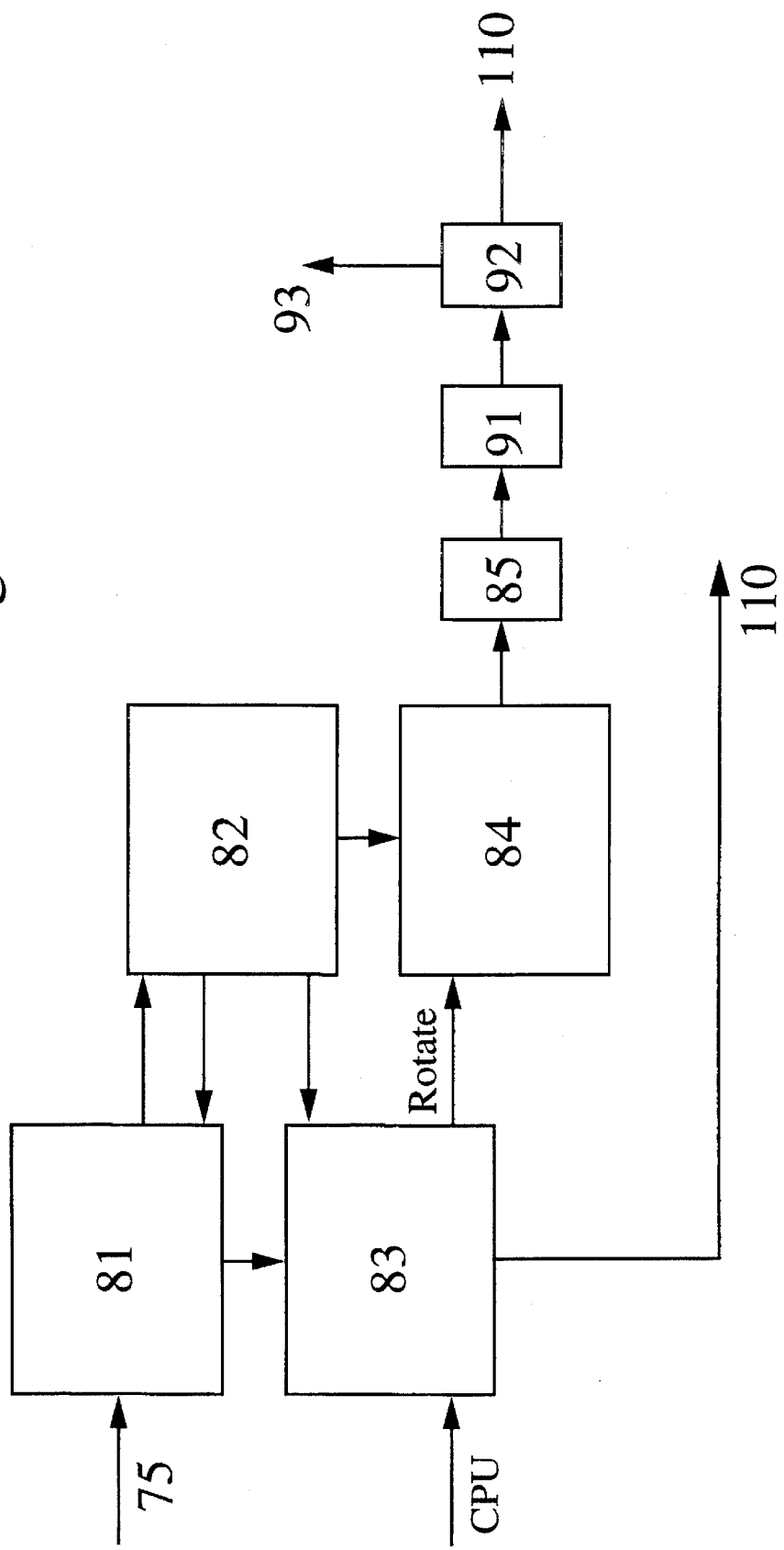
FIG. 6 is a block diagram of part of the timing recovery and phase control system according to one embodiment.

An illustrative circuit is illustrated in overall block form in FIG. 5, and detailed block diagrams of the inventive system in FIG. 6.

FIG. 5 illustrates the transmission and reception components of the modem 50 in overview. The embodiment illustrated is in the context of a supergroup modem using a 1024 point QAM system, particularly adapted for undersea cables. This particular application is described in more detail in co-pending Australian Patent Application No. 72095/91.

Raw G703 format data enters the transmitter stage 52 and is processed by the transmitter forward error correction (TXFEC) unit 60. This unit performs outer scrambling, encodes the data, preferably via concatenated Reed-Solomon FEC encoders, inner scrambles the resulting output, and encodes the output as complex data points in a 1024 point QAM constellation. The data rate of the resulting I and Q components is then increased via interpolating filters and output to modulator 70.

Modulator 70 processes the I and Q channels to produce an analog G233 output signal for transmission.

The received G233 signal enters the receiver stage 51. Receiver input unit 100 amplifies and bandpass filters the incoming signal, and digitises it, preferably using a 12 bit ADC. The digitised signal is both fed back to provide automatic gain control, and output to demodulator and equaliser unit 90. The signal is demodulated, preferably by hardware multiplication, to produce a complex baseband waveform. The I and Q channels are decimated in parallel, preferably by 2-stage filters. This output is then equalised and output to the phase control unit 80, the operation of which will be described in more detail below.

Phase control unit 80 outputs gray decoded data to the receiver FEC unit, which decodes and unscrambles the signal for output as G703 format data.

It will be appreciated that the modem as generally described above is of known configuration.

FIG. 6 shows in more detail the operation of the hardware associated with the inventive technique. As described above a known signal, for example a set of scrambled binary 1s, is transmitted. This particular constellation is sent at the time of synchronisation being established at start up, or at any later time when synchronisation is lost. Such sequences are part of the synchronisation procedure of many modems.

A received signal is initially processed as described above, and the equaliser output 75 enters APC unit 81. The signal quantised by reference to quantiser EPROM 82 to recover a constellation point, output to timing recovery device 83, and then to Gray decoder EPROM 84. The output signal passes through parallel to serial converter 85, and is processed by inner descrambler 91 before reaching gate device 92. If the gate device 92 receives a signal of descrambled binary 1s, as would be the case if the rotation of the constellation were correct, a signal is sent to the CPU (not shown) via output 93 indicating correct synchronisation. If any output is a 0, then a different signal is sent via output 93, and the CPU sends a command to timing recovery unit 83 to perform a quadrant rotate operation—in other words, to compare the signal to a different part EPROM 20. In the illustrative case the constellation is 'rotated' 90°. This procedure continues until synchronisation is obtained.

In the illustrative system, a further check of correct rotation occurs by the receiver FEC 60 and transmitter FEC synchronising—this cannot occur unless the rotation of the constellation is correct.

Preferably, APC 81 and timing recovery 83 are performed by DSP integrated circuits, for instance 56001R20 devices.

It will be appreciated that the present invention is applicable to systems which do not use block coding, and indeed to modems of most conventional types, for instance those complying with CCITT standards V.22, V.22bis, V.32 and V.33. The preferred version, using a sequence of binary 1s, is partly performed within the normal synchronisation procedures of conventional modems and can be readily implemented.

It should be appreciated that the embodiment described is merely illustrative and is in no way limitative of the broad inventive concept of coding which is not rotationally symmetrical described above.

I claim:

1. An improved method for encoding and decoding QAM signals without the use of differential encoding, wherein prior to transmission the signal constellation is directly encoded such that successive non-self-mapping rotations about the axes of symmetry of the constellation do not create identical signals, and during reception said signal is decoded by a method comprising successively comparing a received signal with a set of stored signals corresponding to the possible received rotations of a known signal, until a match is found, and thereby resolving the rotational orientation of the received signal.

2. A method for encoding digital signals for transmission on analog media, comprising the steps of:

converting a digital signal into a set of digital words, each having a predefined length;

encoding each of said words without differential encoding as a point in a signal constellation, each point being defined by a quadrature component and an in-phase component;

wherein said constellation is chosen such that successive non-self-mapping rotation with respect to the axes of symmetry will not map the constellation onto itself.

3. A method for encoding and decoding digital signals for transmission on analog media, comprising:

encoding a digital signal for transmission by a method comprising the steps of:

converting a digital signal into a set of digital words, each having predefined length; encoding each of said words as a point in a signal constellation, each point being defined by a quadrature component and an in-phase component, said encoding not including differential encoding; wherein said constellation is chosen such that successive non-self-mapping rotations with respect to the axes of symmetry will not map the constellation onto itself, and decoding a received analog signal by a method comprising the steps of:

receiving a signal corresponding to a known digital word; comparing said signal to each one of a set of stored possible received signals corresponding to different rotational orientations, until the signal corresponding to the received signal is located; and thereby receiving signals, and producing corresponding digital words, by reference to the determined rotation of the received signal constellation and a stored set of digital words corresponding to received signal points; and reproducing the digital signal encoded at transmission.

* * * * *